United States Patent [19]

Hernandez et al.

[11] Patent Number: 4,674,043
[45] Date of Patent: Jun. 16, 1987

[54] UPDATING BUSINESS CHART DATA BY EDITING THE CHART

[75] Inventors: Irene H. Hernandez, Austin; Barbara A. Barker, Round Rock; Carol S. Himelstein; Beverly H. Machart, both of Austin, all of Tex.

[73] Assignee: International Business Machines Corp., Armonk, N.Y.

[21] Appl. No.: 719,210

[22] Filed: Apr. 2, 1985

[51] Int. Cl.⁴ ............................................ G06F 3/153
[52] U.S. Cl. .................................. 364/401; 364/521; 364/900
[58] Field of Search ............... 364/401, 518, 521–522, 364/900 MS File; 340/722, 709, 710

[56] References Cited

U.S. PATENT DOCUMENTS 4,303,973 12/1981 Williamson .......................... 340/722
4,355,805 10/1982 Baer ..................................... 340/709
4,555,699 11/1985 Citron ................................. 340/709

FOREIGN PATENT DOCUMENTS 3063774 8/1981 Fed. Rep. of Germany ...... 340/722
8200726 3/1982 PCT Int'l Appl. .................. 340/722

Primary Examiner—Jerry Smith
Assistant Examiner—G. Hayes
Attorney, Agent, or Firm—C. Lamont Whitham

[57] ABSTRACT

A method of updating business chart data by editing the business chart is disclosed. The chart is displayed using predefined data. A draw graph object of the business chart is selected for editing. When the editing action is completed, a check is made to determine whether the action on the business chart destroyed the relationship between the chart and the predefined data. If it did and if the user has selected the two-way editing mode, the predefined data is updated to reflect the edited chart.

3 Claims, 5 Drawing Figures

FIG. 1
| | 1 | 2 |
|---|---|---|
| 1 | COMPANY NAME | MARKET PERCENTAGE |
| 2 | A | 48 % |
| 3 | B | 75 % |
| 4 | C | 97 % |
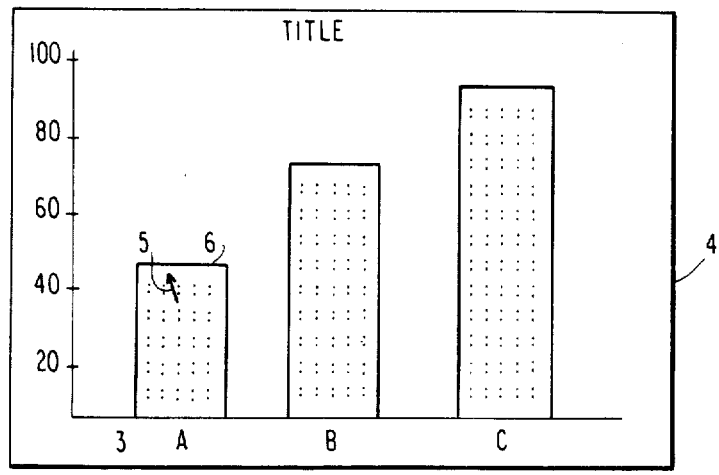
FIG. 2
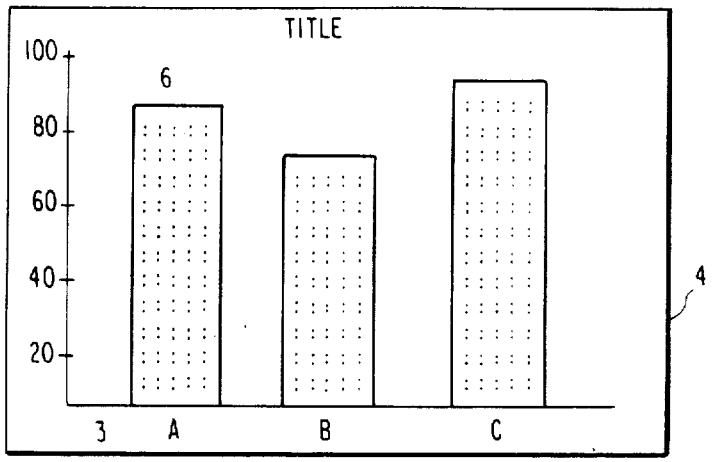
FIG. 3
FIG. 4
| | 1 | 2 |
|---|---|---|
| 1 | COMPANY NAME | MARKET PERCENTAGE |
| 2 | A | 88% |
| 3 | B | 75% |
| 4 | C | 97% |

UPDATING BUSINESS CHART DATA BY EDITING THE CHART

DESCRIPTION

Cross-Reference to Related Application

This application is related to the subject matter disclosed in copending patent application Ser. No. 06/719,233 filed concurrently herewith by Irene H. Hernandez, Barbara A. Barker, Carol S. Himelstein and Beverly H. Machart and entitled "Editing Business Charts". The subject matter to said application is incorporated herein by reference.

Technical Field

The subject invention generally relates to editing business graphics and, more particularly, to updating business chart data through the process of editing the business chart.

Prior Art

Application programs for generating business graphics such as line graphs, bar charts and pie charts have been quite popular in the presentation of business data such as sales, budgets and the like. Generally, these programs require the input of the data and the format of the chart (i.e., line, bar, scatter, etc.), and from this information, the business graph is generated for display, printing and/or plotting. Usually, one or more methods is provided for the input of the data. The operator can manually enter the data according to a predefined program format or specify that the data be retrieved from a data file created by a data base program or a spreadsheet program. In the latter case, the data is transported automatically to the business graphics program after the operator has defined the source for the data, the format of the chart including type and attributes and any headings, legends, titles, labels or other textual annotation.

Some applications do not allow the operator to modify any part of the business graph without totally regenerating the chart. This is because the components of the graph are not treated as individual objects. Recent business graphics programs tend to view the chart as a single object. Headings, legends, titles, axes labels and other annotations are also treated as separate objects. The operator may be able to change the pattern or color of one of the shaded areas in a bar or pie chart, add more textual annotation and move the text to a different location, insert an arrowed line and stretch the line in any direction, explode a section of a pie chart, or change the size, font or location of a chart legend. Limited editing of the entire chart, such as scaling, rotating or moving, may also be provided.

There are some cases, however, where the operator may want to enhance the business graph by editing the chart components, such as the lines, bars, points or pie wedges, that represent the data. That is, the operator may want to select one bar in a bar chart, for example, and stretch the bar to emphasize what profits might have been for the last quarter of 1984, if the sales level for the first three quarters of the year had been maintained. In a pie chart, the operator might want to move the side of a wedge up or down to illustrate a projected sales percentage for the coming year. For added emphasis and clarity, the operator might want to move or rotate the exploded section of a pie chart. The implementation method that allows the operator to edit and manipulate the components of a business graph in the same manner that components of a draw graph in the same manner that components of a draw graph picture are edited is detailed in the above-referenced copending patent application by Irene H. Hernandez, Barbara A. Barker, Carol S. Himelstein and Beverly H. Machart entitled "Editing Business Charts".

Additionally, there may be cases where the operator wants to use the business chart as a planning tool. That is, the operator may want to edit an existing business chart, for example a bar chart representing total sales for 1984 for each of several company divisions, to show what total sales might be for 1985. Once editing of the bar chart is completed, the operator may need to know what data values are required to represent the 1985 sales projections, i.e., what changes must be made to the 1984 data to project the 1985 results. What is needed, then, is a program that would allow the operator to edit a business chart so that it illustrates the desired projection and then updates the predefined data so that the data is accurately reflected in the edited chart.

SUMMARY OF THE INVENTION

It is therefore an object of the subject invention to provide a way to update business chart data by editing the business chart.

According to the invention, an application program is provided which allows the operator to create a business chart from a predefined set of data or from keyed input queried by the system. A chart is composed of draw graph objects such as lines, bars, circles, text, and the like required to present the data in a graph form. When the chart is created, a link between the chart and the data is also created. As long as the integrity of the data is not compromised, this link is maintained.

Since a business chart implies a grouping of data, the application program groups together all the objects required to create the chart or graph. Although the chart is a group of objects, the operator has the option of manipulating any of the objects comprising the group as well as the entire group. Enhancements to the chart can be made by selecting any of the objects in the chart and changing one or more of the attributes such as color, fill pattern, character font or the like. Since these enhancements do not change the data represented by the chart, the link between the chart and the data is maintained. However, if a different representation of the data is desired, any of the objects can be stretched, shrunk, scaled or moved until the desired modifications to the chart have been achieved. If the results of the editing action make the chart incompatible with the data from which the chart was originally created, and if the operator has selected the twoway update mode, the system automatically updates the chart data to reflect the results of the editing action. It is to be assumed that all chart objects, commands and options are selectable via a cursor that is typically controlled by a mouse or similar device.

BRIEF DESCRIPTION OF THE DRAWINGS

The foregoing and other objects, aspects and advantages of the invention will be better understood from the following detailed description of the invention with reference to the drawings, in which:

FIG. 1 is a table of data to be used for generating a siness chart;

FIG. 2 is a bar chart generated from the table of data in FIG. 1 wherein a bar in the chart has been selected for editing;

FIG. 3 illustrates the result of a stretch action on the selected bar from the chart in FIG. 2;

FIG. 4 is a table illustrating how the data of the table in FIG. 1 is changed to reflect the new size of he modified bar in the bar chart of FIG. 3; an FIG. 5 is a flow diagram showing the operation of the invention.

DETAILED DESCRIPTION OF A PREFERRED EMBODIMENT OF THE INVENTION

Figure 5:
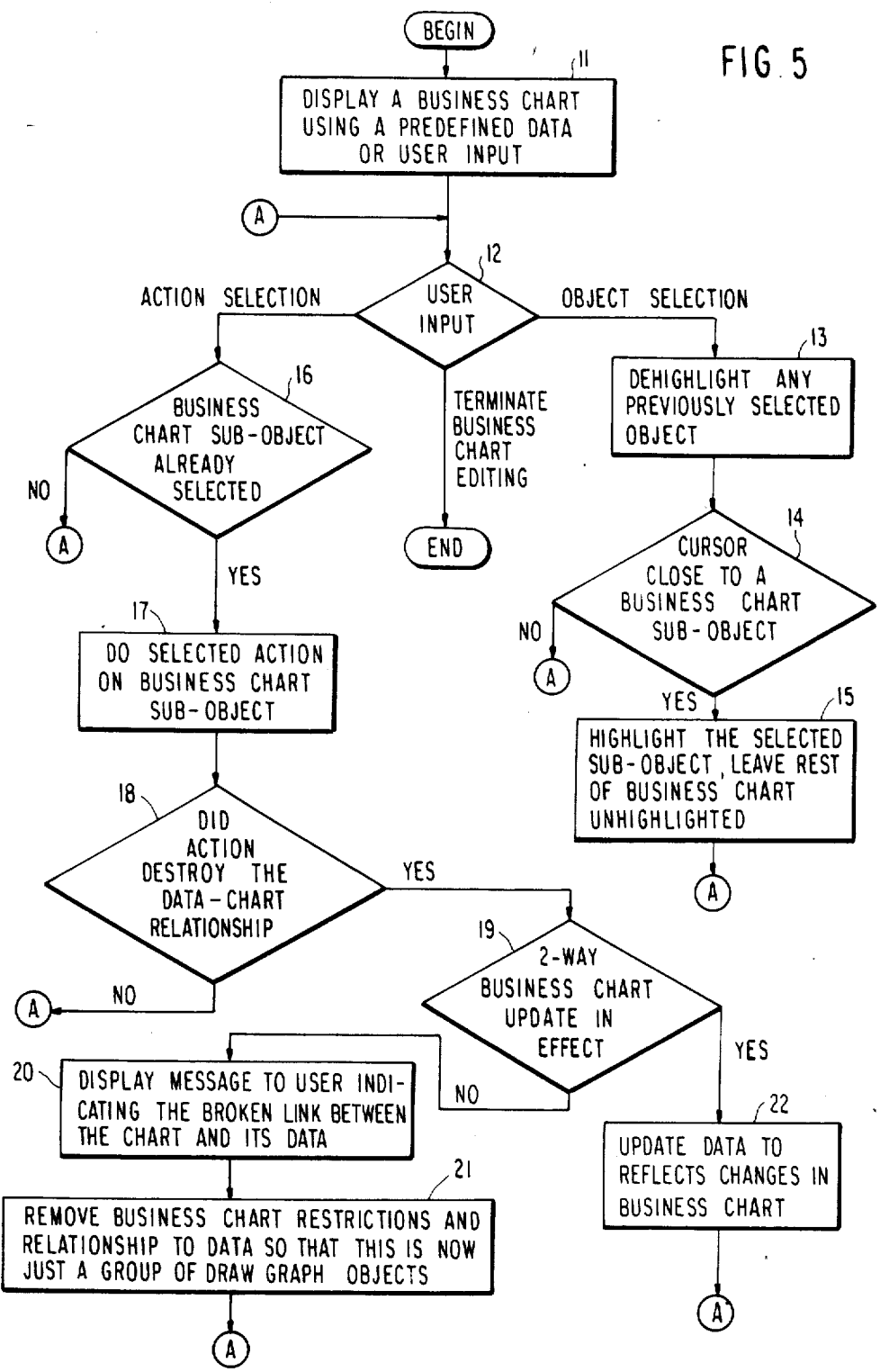

For a more detailed understanding of the invention, reference is first made to FIG. 1 of the drawings. In this figure, there is illustrated a table 1 with data to generate a chart. Percentage 2 represents the market percentage of Company 3. It is assumed that an application program queries the user for the data in table 1 or that the data is provided by a data base or a spreadsheet.

Referring to FIG. 2, chart 4 is generated from the data of table 1 in FIG. 1. It is assumed that the chart is being displayed on an all points addressable (APA) cathode ray tube (CRT) or similar display screen of a display device controlled by a stand alone computer or a host connected computer work station or system. The application composes the chart from primitive graphic objects to reflect the data in table 1 of FIG. 1. The application program also maintains a two-way link between the data and the chart.

When operation is within chart 4, the point of operation can be denoted by a cursor 5. As cursor 5 is moved by a device, the point of operation is moved. The device can be a mouse, keyboard, joystick or similar device. The particular characteristics of cursor 5 are unimportant as far as the invention is concerned. That is, the cursor could be a standard textual type cursor, a pointing cursor, located adjacent the next available character box, and so forth. Cursor location and movement are directly related to editing. Editing encompasses insertion, deletion, replacement, and similar operations.

Cursor 5 as shown in FIG. 2 denotes the operator selection of bar 6 for editing. For the purposes of this invention, the operator desires to change the size of bar 6 to reflect a more competitive picture of the data representing company 3. The operator initiates the TWO-WAY CHART UPDATE mode and selects the STRETCH action which results in bar 6 growing as shown in FIG. 3. The result of the action causes bar chart 4 to no longer reflect the data which originally created the chart. Because the user initiated the TWO-WAY CHART UPDATE mode, the application will automatically update the data reflecting company 3 in table 1 as shown in FIG. 4. Using the two-way link established between the data and the chart, the application can automatically update percentage 2 to reflect the new size of the edited bar. The integrity of the data reflected in the chart is maintained.

The following is an illustration of an application program useable by a processor in the work station or host computer for updating business chart data by editing the chart. This program is in program design language (PDL) from which source and machine code are derivable. In the following, it is assumed that the work station is under at least keyboard device control and that the operator has initiated an action requiring the system to provide a business graphics editing environment that includes a set of objects with distinctive properties and a set of actions that can be applied to the objects and properties. (A business chart has been displayed, and the operator has selected a chart sub_object and a graphic action.)

```
CALL EDIT_CHART(ACTION, SUB_OBJECT, RESULT)
IF RESULT = DATA/CHART RELATIONSHIP CHANGED
THEN CALL QUERY_UPDATE_MODE(EDIT_MODE)
IF EDIT_MODE = TWO-WAY CHART UPDATE MODE
THEN CALL UPDATE_DATA(CHART, DATA)
ELSE CALL BREAK_LINK(CHART, DATA)
CALL DISPLAY_MSG
CALL CHANGE_TO_DGGROUP
ENDIF
ENDIF
```

(Operator terminates chart editing.)

After the operator selects a business chart sub_object and a graphic action indicating that the sub_object is to be edited, the system calls a routin to edit the chart (CALL EDIT_CHART(ACTION, SUB_OBJECT, RESULT)). ACTION and SUB_OBJECT are input parameters and RESULT is the output parameter. ACTION tells the routine the graphic action is to be performed on the selected object (SUB_OBJECT). RESULT is an output parameter that is ued to communicate the effect ACTION had on the chart. If RESULT indicates that the representation of the data in the chart has been changed, the system calls a routine (CALL QUERY$_{13}$ UPDATE_MODE) to determine if the operator entered the TWO-WAY CHART UPDATE mode. QUERY_UPDATE_MODE returns a parameter EDIT_MODE indicating the mode currently in effect. If the EDIT _MODE=TWO_WAY CHART UPDATE MODE, the system calls a routine to update the data belonging to the chart (UPDATE_DATA(-CHART, DATA)).

However, if the EDIT_MODE <> TWO-WAY CHART UPDATE MODE, the internal ink between the chart and the data is removed (CALL BREAK_LINK). A message is displayed to the operator indicating that the link has been broken (CALL DISPLAY_MSG), and the chart is changed from a business group type to a draw graphics group type (CALL CHANGE$_{13}$ TO_DGGROUP).

At this point, the operator can terminate editing of the business chart or can continue modifying the chart and the corresponding data.

The flow diagram in FIG. 5 shows the operation of the invention. In order to start the business graphics editing session, the operator initiates the display of the business chart. The actions required to do this are not detailed here as they have no relevance to this invention. Those skilled in the art will understand that the business chart can use data from an existing spreadsheet or data base file or the operator can type the data on the keyboard when queried by the system. The business chart is then displayed in one of several forms (bar chart, pie chart, line chart, scatter chart, or other form provided by the application) depending on a selection by the operator. The chart is generated from draw graph objects such as rectangles, lines, circles, and the like. A link is maintained by the system between the business chart and the data from which it was created. All this is accomplished in block 11 of the flow diagram.

Once the chart is created, the operator can start editing it in the same way as any graphic object. In block 12, the system monitors the operator's input and decides what action to take as a result of that input. So long as the cursor is moved within the business chart area, the system tracks the cursor and highlights any individual object over which the cursor moves. The operator is therefore made aware of the individual graphic objects. Moving the cursor outside the business chart area indicates that the routine is to be terminated. Other actions, such as pressing the END (QUIT) key, also terminates editing of the chart.

Control passes to block 13 when the OBJECT SELECT key is pressed. In this block, the system dehighlights any other object that may already be highlighted providing feedback to the operator that the previously highlighted object is no longer selected. Next, as indicated in block 14, the system checks to see if the cursor is close enough to any of the business chart sub-objects to select one. If the cursor is not close enough, control returns to block 12. Otherwise, the system highlights the selected sub-object, leaving the rest of the business chart unhighlighted. This action is indicated by block 15 and shows the operator exactly what has been selected.

Control then returns to block 12 where the system resumes monitoring the operator's input. The operator is free at this point to do any available action on the selected object. When the operator selects an action, control passes to block 16 where the system checks to determine that an object has already been selected. If no object has been selected, the action selection is ignored and control is passed back to block 12. If an object has been previously selected, that action is performed on the object as indicated in block 17. The actions valid for a business chart sub-object are the same as those that are valid for any draw graphic object, namely, stretch, shrink, scale up or down, rotate, move, smooth, copy or delete. The implementation of these actions is not detailed here as it is not the subject of this invention.

Once the action has been completed, the system, as shown in block 18, checks to see if the results of the action have made the chart incompatible with the data used to generate the business graph. If there is no data incompatiblity, control returns to block 12. If, however, there is a discrepancy between the chart and the corresponding data, the system, as indicated in block 19, checks to see if the operator has selected a mode that allows two-way update of business charts. In other words, the chart can be updated by updating the data from which it was created, or the data can be updated by updating the chart itself. If the operator is not in the two-way update mode, control passes to block 20 where a message is displayed notifying the operator that the information conveyed by the chart is no longer consistent with the data. If desired, the operator can undo the action and return the chart to a consistent data state. In block 21, the system removes the link to the data and changes the business chart into a group of draw graph objects. At this point, control returns to block 12.

If the operator is in two-way update mode, control passes to block 22 where the data is updated to reflect the changes made to the chart. Once this step is completed, control returns to block 12.

While the invention has been particularly shown and described with respect to a preferred embodiment thereof, it will be understood by those skilled in the art that changes can be made in form and detail without departing from the scope and spirit of the invention.

Having thus described our invention, what we claim as new, and desire to secure by Letters Patent is:

1. A method of updating business chart data by editing the chart on a computer comprising the steps of:
   displaying a business chart using predefined data;
   creating a two-way link from said business chart to said data;
   editing a selected graph object belonging to said chart so that said business chart no longer represents the predefined data; and
   updating the predefined data to reflect the result of the editing action.

2. The method of updating business chart data as recited in claim 1 further comprising the steps of:
   selecting either a two-way or a one-way edit mode for said chart and said data; and
   determining that the two-way edit mode has been selected before performing said step of updating the predefined data.

3. The method of updating business chart data as recited in claim 2 further comprising the steps of:
   checking the two-way link from said business chart to said data after the step of editing to determine if the editing action destroyed the relationship between the predefined data and the business chart; and
   displaying message to the operator indicating broken link between the chart and the data if the relationship has been destroyed and if said two-way edit mode has not been selected.

* * * * *